United States Patent
Vossos

[15] 3,644,213
[45] Feb. 22, 1972

[54] STABILIZING AQUEOUS DEIONIZED SILICA SOLS OF SMALL PARTICLE SIZE AGAINST CELLING

[72] Inventor: Peter H. Vossos, Berwyn, Ill.
[73] Assignee: Nalco Chemical Company, Chicago, Ill.
[22] Filed: Dec. 4, 1968
[21] Appl. No.: 781,205

[52] U.S. Cl. .......................... 252/313 S, 106/286, 252/317
[51] Int. Cl. .............................. B01j 13/00, C01b 33/14
[58] Field of Search .................................. 252/313 S

[56] References Cited

UNITED STATES PATENTS 2,574,902  11/1951  Bechtold et al. ..................... 252/313
2,750,345  6/1956  Alexander ............................. 252/313

FOREIGN PATENTS OR APPLICATIONS 521,741  2/1956  Canada .................................. 252/313

Primary Examiner—Richard D. Lovering
Attorney—Kinzer, Dorn and Zickert, John G. Premo, Charles W. Connors and Morando Berrettini

[57] ABSTRACT

A starting aqueous silica sol of greater than 20 percent solids content and of no more than about 8 millimicrons average particle size is stabilized by deionization, and by adding deionized water to the resulting sol before the lapse of about 48 hours following deionization until the solids concentration is reduced to about 15 percent.

1 Claims, 1 Drawing Figure

Legend—
I and II are alternatives for PRODUCT A.
I, III and IV are alternatives for PRODUCT B.

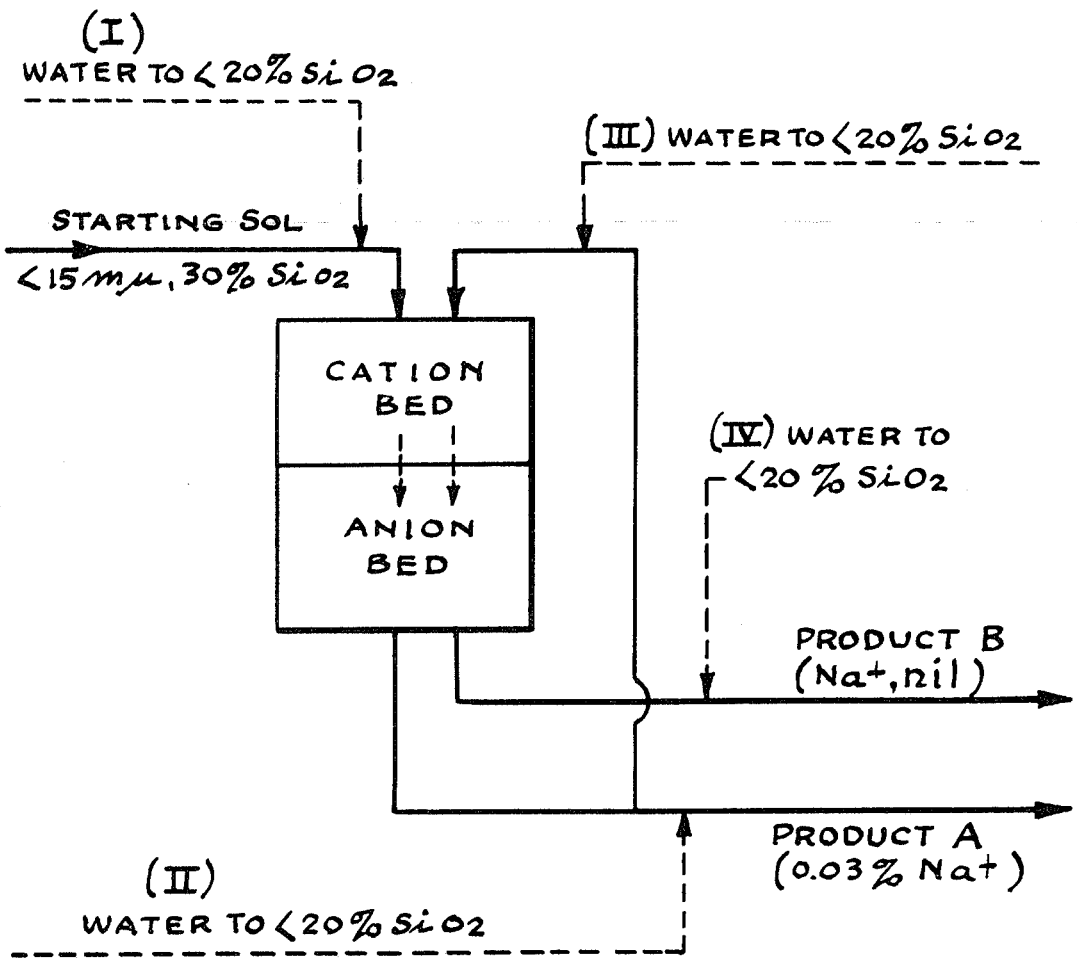

STABILIZING AQUEOUS DEIONIZED SILICA SOLS OF SMALL PARTICLE SIZE AGAINST GELLING

This invention relates to the production of deionized silica sols stabilized against gelling, and in particular to the production of stabilized silica sols presenting a particle diameter of less than about 15 millimicrons.

Deionized silica sols having an average particle diameter of about 15 millimicrons in a 30 percent concentration may gel only after a lapse of about 6 months, while those of about 8 millimicron size gel in a considerably less period of time.

The smaller particle diameter sols have been found to present features of utility not possessed by sols having a particle diameter greater than 15 millimicrons. This has been found in laboratories concerned with research in rubber processing, printing, and the production of permanent crease fabrics; such sols of small particle diameter size also give promise of utility for the production of catalysts and foam rubber.

Most research laboratories prefer such small particle diameter silica sols in completely deionized, salt-free form, although a sol with a small, tolerable sodium ion content presents limited utility at the smaller particle level not possessed by those of larger particle size. Quite naturally the preference is for a sol of prolonged stability, and the primary object of the present invention is to produce highly stable silica sols of a very small particle diameter, either in a completely deionized form (free of Na+ for all practical purposes), or in a substantially deionized form where the sodium ion (Na+) content will not exceed a maximum. A related object of the present invention is to enhance and promote research work in a wide variety of fields by making available stabilized silica sols of extremely small particle size.

In the drawing:

The drawing is a diagrammatic flow chart illustrating alternative procedures in practicing the present invention.

For the purposes of this invention, instability is the occurrence of gelation, and gelation is defined as the point at which bubbles will not ascend in the sol system immediately after vigorous shaking. Stability is measured at room temperature and at 140° F. where gelation is purposely accelerated to be equivalent to many times that of the room temperature phenomenon. I have found that stabilities in excess of a year, for deionized silica ($SiO_2$) sols in water, having an average particle diameter of only 8 millimicrons, may be attained provided the solids content ($SiO_2$) is less than 20 percent by weight. In fact, the stability is at an unexpectedly high level at a solids content of 15 percent. Deionization may be complete for all practical purposes (sodium ion content nil) by subjecting the sol to two passes or cycles through a cation-anion exchanger. However, if a product of severely limited Na+ content is tolerable, then a satisfactory, highly stable sol may be attained by only one cation-anion deionization cycle, provided the solids content is held below a 20 percent concentration as noted above.

The preference is to commence deionization with a more concentrated sol, say 30% $SiO_2$ solids. The starting sol of higher concentration is then diluted, preferably to 15 percent solids concentration, but in any event, less than about 20 percent. Dilution may be made before any deionization; it may be made after the first deionization cycle; or it may be made within a reasonable lapse of time after the second deionization cycle.

The invention is not limited to any particular form of deionization, but data in this instance were collected while using a deionization system conforming to the disclosure in U.S. Pat. No. 3,342,747, as follows:

| | |
|---|---|
| Column: | 2 inches (I.D.)×52 inches |
| Resin: | 500 ml. SBR—OH⁻, bottom (cationic)* |
| | 1,250 ml. HCR—H⁺, top (anionic)** |
| Solution: | 30% $SiO_2$ (0.62% $Na_2O$) particle diameter (average) 7.6 millimicrons |
| Rate: | 160 ml./min., first pass |
| | 60 ml./min., second pass |

*See U.S. Pat. No. 2,591,573
**See U.S. Pat. No. 2,366,007

The resin bed ion exchanger had an excess capacity, purposely calculated as 20–30 percent excess, to permit a single exchange column to accommodate both passes of the solution to be deionized.

The data in Table I indicate that dilution (with deionized water) to a 15% $SiO_2$ solids concentration may be accomplished at almost any time, although a trend toward gelation is indicated if dilution is delayed after a lapse of 90 hours following the second pass (complete) deionization step.

TABLE I

Effect of Time of Dilution on Stability

| Product Sol | | Stability at 140° F. | Viscosity (room temperature) After 85 days |
|---|---|---|---|
| 30% 2nd pass 15% diluted: | | <1 days | — |
| | before 1st pass | >80 days | 8.9 cps. |
| | between passes | >80 days | 14.6 cps. |
| | immediately after 2nd pass | >80 days | 19.1 cps. |
| | 8 hours after 2nd pass | >80 days | — |
| | 24 hours after 2nd pass | >80 days | 14.8 cps. |
| | 90 hours after 2nd pass | 17 days | 80.4 cps. |

Based on an interpretation of the data in Table I, attainment of the preferred lower concentration (15 percent) in a commercial product should be achieved before the lapse of about a 48-hour period following the first pass, for a completely deionized, salt free sol. Both the one-pass and two-pass products are completely salt free for all practical purposes and the two-pass product is void of sodium ions.

However, if the circumstances of ultimate utility will tolerate a small sodium ion content, up to about 0.05 percent by weight (but preferably about 0.03 percent), then a highly stabilized product at the desired small particle diameter (less than 15 millimicrons) can be attained by a single deionization cycle, as shown by the data in Table II.

TABLE II

Effect of Dilution on Stability

| Lot Number | Number of Passes | % $SiO_2$ | Stability Room Temp. | 140° F. |
|---|---|---|---|---|
| 104–4 | 1st | 30 | — | 4 hr. |
| | 1st | 20 | 15 days | 18 hr. |
| | 1st | 15 | >1 year | 183 days |
| | 2nd | 30 | 3 days | 10 hr. |
| | 2nd | 20 | 14 days | 1 day |
| | 2nd | 15 | 130 days | 22 days |
| 307–4 | 1st | 30 | 2 days | 4 hr. |
| | 1st | 25 | 6 days | 12 hr. |
| | 1st | 20 | 120 days | 167 days |
| | 1st | 15 | >1 year | 210 days |
| | 2nd | 30 | 5 days | 10 hr. |
| | 2nd | 25 | 8 days | 16 hr. |
| | 2nd | 20 | 20 days | 16 hr. |
| | 2nd | 15 | 210 days | 185 days |

It will be observed from the data in Table II that a high degree of stability could not be achieved for a sol having a concentration of 20 percent and upwards, regardless of whether deionization is partial (first pass only) or complete, but at a concentration of 15 percent the stability level is suddenly and remarkably high; in fact, it is evident that when concentration is maintained under 20 percent ($SiO_2$ solids) a sol subjected to a single deionization cycle (first pass only) displays a level of stability in excess of the completely deionized product.

These observations result in a choice of a stabilized product. If a stabilized sol of the small particle size is wanted in a completely deionized salt-free form, then the starting sol will be deionized in two cycles while maintaining a concentration of less than 20 percent for the product. On the other hand, if a small Na$^+$ content can be tolerated in a salt-free stabilized sol of the small particle size, then economy can be realized by resorting to a single deionization pass through the cation-anion deionization column. This aspect of the invention is unusual because the pH of the resultant sol tends toward a value of 7, and attains a pH of 7 after a prolonged lapse of time, a pH level considered to encourage instability.

As a definition, therefore, I consider the first deionization cycle, however conducted, to be one which will produce a salt-free sol having a sodium ion content of about 0.03 percent (but not more than 0.05 percent) by weight; whereas the same sol deionized in a second cycle will be void of sodium ions for all practical purposes.

The drawing illustrates the alternative procedures available. The starting sol may be diluted instantly to a concentration of less than 20 percent (I), or it may be diluted (II) to this concentration after the first deionization step to yield product A which is a salt-free stabilized sol of less than 15 millimicrons particle diameter having a limited Na$^+$ content of about 0.03 percent. Alternatively, the end product may be product B (completely deionized and salt-free) achieved by two passes through the deionizer, with dilution accomplished at any stage, as long as dilution is made before a lapse of about 48 hours following deionization, a limitation which also prevails for product A. Thus, even when dilution is accomplished before the starting sol is subjected to the first deionization cycle, for product A or product B, there is compliance with the requirement that dilution be completed before a lapse of about 48 hours following deionization, whether deionization be a matter of one pass or two passes through the cation-anion beds. The exact mode of deionization is immaterial to this invention, but I prefer to relay upon the disclosure in U.S. Pat. No. 3,342,747.

As to the exact particle size of the starting sol, less than 15 millimicron particle diameter, average particle size controls, and the primary consideration is the demand of the customer; but again, it is immaterial what process is used to achieve a starting sol of small particle content. The data set forth in Table II clearly show the remarkable increase in stability when confining the product to a is percent concentration. This concentration is therefore deemed the optimum, but a small departure of 2 or 3 percentage points to a higher concentration is permissable for production purposes as long as one avoids a 20 percent concentration. While the sol employed for study was one of 7.6 millimicron particle diameter, this is only representative of the class of sols of particle diameter (average) less than 15 millimicrons, and is not a restriction on actual practice.

Hence, while I have disclosed the preferred practices of the invention, it is to be understood that variations are possible within the limits mentioned and within the purview of the following claims.

I claim:

1. A method of achieving stability in a starting, aqueous silica sol of small particle size without imparting alkalinity or acidity thereto in order to achieve stability, comprising, selecting the starting sol as one of greater than 20 percent (by weight) solids content and of no more than about 8 millimicrons (average) particle size, deionizing the starting sol, and adding deionized water to the sol before the lapse of about 48 hours following deionization until the solids concentration is reduced to about 15 percent.

* * * * *